United States Patent [19]

Thullen et al.

[11] Patent Number: 5,177,178
[45] Date of Patent: Jan. 5, 1993

[54] AMORPHOUS COPOLYAMIDE FROM DIMER ACID, AROMATIC DICARBOXYLIC ACID AND CYCLOALIPHATIC DIAMINE

[75] Inventors: Helmut Thullen; Eduard Schmid, both of Bonaduz, Switzerland

[73] Assignee: EMS-Inventa AG, Switzerland

[21] Appl. No.: 734,923

[22] Filed: Jul. 24, 1991

[30] Foreign Application Priority Data

Jul. 27, 1990 [DE] Fed. Rep. of Germany ....... 4023969

[51] Int. Cl.$^5$ ............................................ C08G 69/34
[52] U.S. Cl. ................................. 528/339.3; 528/323; 528/324; 528/330; 528/331; 528/338; 528/339; 528/340; 528/346; 528/347

[58] Field of Search .................... 528/339.3, 323, 324, 528/330, 331, 338, 339, 340, 346, 347

[56] References Cited

U.S. PATENT DOCUMENTS 4,791,169 12/1988 Drawert et al. ................. 528/339.3

Primary Examiner—Harold D. Anderson
Attorney, Agent, or Firm—Jordan B. Bierman

[57] ABSTRACT

Rigid, amorphous copolyamides which can be produced in a single-stage polycondensation reaction with a high glass transition temperature and low water absorption capacity, based on cycloaliphatic diamines, dimerized fatty acids and aromatic dicarboxylic acids.

17 Claims, No Drawings

AMORPHOUS COPOLYAMIDE FROM DIMER ACID, AROMATIC DICARBOXYLIC ACID AND CYCLOALIPHATIC DIAMINE

The invention relates to novel copolyamides which are suitable for the production of shaped articles having a high glass transition temperature, rigidity, and impact resistance, as well as low moisture absorption. It is also directed to a process for producing these copolyamides and their use for production of shaped articles.

BACKGROUND OF THE INVENTION

Thermoplastically processible polyamides can be divided into semicrystalline and amorphour homo- and copolyamides.

The semicrystalline polyamides form an important group of commercial thermoplastics. Shaped articles produced from them are distinguished by high strength, rigidity, toughness, surface hardness, good abrasion behavior, and excellent resistance to chemicals and stress-crack resistance. However, the usefulness of these semicrystalline homo- and copolyamides, for example the high melting point polyamides PA 6 and Pa 6,6, is substantially reduced by their tendency to absorb water and the associated reduction of the glass transition temperature resulting in loss of rigidity and strength.

Rigid amorphous copolyamides are generally produced from aromatic dicarboxylic acids and diamines having crystallization-inhibiting structures, and can contain further comonomers such as amino acids, lactams, and salts of diamines and dicarboxylic acids. The properties of such copolyamides can be intentionally varied within wide limits by the choice of monomers used in each case.

As already mentioned, the glass transition temperature drops due to moisture absorption, which in turn causes a reduction of the upper use-temperature. The temperature of use of molded bodies is greatly reduced, leading to a considerable limitation in their utility.

Amorphous copolyamides are described, for example, in the following patents: GB 619,707, CH 449,257, U.S. Pat. No. 2,494,563, U.S. Pat. No. 3,842,045, U.S. Pat. No. 3,840,501, JP 72/11,502, U.S. Pat. No. 2,969,482, U.S. Pat. No. 3,597,400, DE 21 59 803, and CH 624,970.

It is also known to use polymeric—in particular dimerized—fatty acids for the production of polyamides and copolyamides. These materials are used, for example, in adhesive and lubricant polymer chemistry. The structure and properties of dimerized fatty acids are described in detail in, for example, the Henkel-Emery/Gouda (NL) brochure entitled "Empol Dimer and Polybasic Acids, *Technical Bulletin* 114". These dimerized fatty acids are obtained from monomeric unsaturated fatty acids usually containing 18 carbon atoms by a specific polymerization reaction. There are many products having different ratios of monofunctional, difunctional, trifunctional, and polyfunctional acids. Types having a high dimer content, for example 90%, in particular 97%, are preferred for the production of thermoplastic polyamides.

CA 8 61 620 describes polyamides derived from 1-amino-3-aminomethyl-3,5,5-trimethylcyclohexane; optionally further diamines and, in particular, at least 25 mol % of dimerized fatty acids, based on all acid components (sebacic acid being the preferred dicarboxylic acid) are included. However, these known copolyamides have low rigidity. The influence of aromatic dicarboxylic acids on the glass transition temperature Tg and rigidity, in particular in molar amounts of more than 25%, based on all acids, is not relevant in this CA-PS, because the copolyamides described are used for the preparation of flexible products such as binders, shoe adhesives, and films.

Thermoplastically processible plastic materials which have high rigidity and strength and which maintain these properties under the influence of moisture (high atmospheric humidity or contact with water) are required for many commercial applications. Preferably, the moisture absorption should be low enough so that the glass transition temperature is affected as little as possible.

DESCRIPTION OF THE INVENTION

The object of the invention is to provide rigid copolyamides with high glass transition temperatures and thus high strength, rigidity, and dimensional stability at elevated temperatures, wherein the glass transition temperature is only slightly influenced by moisture absorption.

The invention is based on the surprising discovery that amorphous copolyamides of a) 50 mol % of at least one cycloaliphatic diamine of Formula I

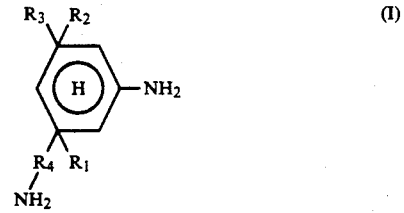

wherein $R_1$, $R_2$, and $R_3$ are alkyl radicals containing 1 to 3 carbon atoms, $R_4$ is a divalent alkylene having 1 to 3 carbon atoms, b) from 5 to 25 mol % of a dimerized fatty acid, c) from 25 to 45 mol % of at least one aromatic dicarboxylic acid, and d) from 0 to 50% by weight, based on the total amount of a), b), and c), of further polyamide-forming monomers, exhibit low water absorption and therefore only a slight change in the glass transition temperature. Therefore, articles produced from these copolyamides have high strength, rigidity, and dimensional stability at elevated temperatures, these properties being maintained even if the articles are exposed to the action of moisture at high temperatures.

DESCRIPTION OF THE PREFERRED EMBODIMENT

A particularly suitable amorphous copolyamide comprises a) 50 mol % of at least one cycloaliphatic diamine corresponding to Formula I, wherein $R_1$, $R_2$, $R_3$ and $R_4$ are alkyl radicals containing from 1 to 3 carbon atoms, b) from 5 to 12 mol % of a dimerized fatty acid, and c) from 38 to 45 mol % of an aromatic dicarboxylic acid, wherein the molar amounts total 100%.

Preferred cycloaliphatic diamines are derivatives of cyclohexane substituted in the 3- and 5-positions with alkyl groups and/or alkylamino groups and, in the 1-position, with an amino group. 1-Amino-3-aminomethyl-3,5,5-trimethylcyclohexane, hereinafter referred to as "Diamine" is particularly preferred.

Dimerized fatty acids (b) include, in particular, those described in the above-mentioned Unilever- or Henkel-Emery-/Gouda (NL) company brochures, i.e. those which are derived from unsaturated fatty acids containing at least 18 carbon atoms. According to the invention, it is preferable to use those dimerized fatty acids which have a dimer content of at least 90% by weight and particularly preferable to use those in which the dimer content is at least 97% by weight. Dimerized fatty acids, which have been hydrogenated and distilled, and therefore have a light inherent color, are preferred.

Aromatic dicarboyxlic acids c) preferably include mononuclear or polynuclear, optionally substituted, aromatic dicarboxylic acids. For example, isophthalic acid, terephthalic acid, naphthalene-dicarboxylic acid, tert-butylisophthalic acid, 1,1,3-trimethyl-3-phenylindan-4',5-dicarboxylic acid, or mixtures thereof can be used advantageously. Isophthalic acid and terephthalic acid, or a mixture of these acids, preferably containing at least 25 mol % of isophthalic acid, are particularly preferred.

Polyamide-forming monomers d) include monomers which are conventional in polyamide production such as aliphatic dicarboxylic acids containing from 6 to 20 carbon atoms, aliphatic diamines containing from 2 to 20 carbon atoms, and/or aromatic/aliphatic diamines containing from 6 to 12 carbon atoms, for example m-xylidenediamine or p-xylidenediamine. Amino acids and lactams containing from 4 to 14 carbon atoms can also be used.

Copolyamides of the invention which are particularly preferred include those which comprise 1-amino-3-aminomethyl-3,5,5-trimethylcyclohexane as well as dimerized fatty acids in a maximum total molar content of 12% based on the copolyamide, i.e. with maximum molar content of 24% based on the total carboxyl groups. In particular, the use of isophthalic acid as the main component of the aromatic acid is most desirable.

The amorphous copolyamides according to the invention are rigid, transparent, and have a glass transition temperature between about 95° C. and about 180° C., the glass transition temperature dropping only slightly during use owing to the low moisture absorption. This is in contrast to the amorphous copolyamides according to the prior art. The glass transition temperature can be varied by adjusting the ratio of dimerized fatty acid to aromatic dicarboxylic acid. If, for example, the copolyamide according to the invention is produced from Diamine with dimerized fatty acid having a dimer content of at least 90% by weight as well as isophthalic acid, Tg is 97° C. at a dimeric acid content of 25 mol %, 158° C. at a dimeric acid content of 12.0 mol %, and about 177° at a dimeric acid content of only 7.5 mol %.

As already mentioned, the outstanding properties of the inventive amorphous copolyamides are low moisture absorption, comparatively stable glass transition temperatures, dimensional stability, transparency, and rigidity. Applications for which neither copolyamides nor polyamides could hitherto be used are opened up for the copolyamides of the invention.

For example, a copolyamide of 50 mol % Diamine, 12 mol % dimerized fatty acid, 21 mol % isophthalic acid, and 17 mol % terephthalic acid, absorbs only 1.3% by weight of water during conditioning at room temperature and relative humidity of 50%, the glass transition temperature falling from 158° C. to 138° C.

The copolyamides according to the invention are also distinguished by high rigidity and impact resistance. If the toughness is not sufficient for special practical applications, it can be raised by addition of usual impact modifiers which are commonly used with polyamides. Such impact modifiers include core/shell polymers, or olefinic elastomers grafted with maleic anhydride.

The copolyamides according to the invention are condensable to high molecular weights and can easily be discharged from the autoclave used for their production. If no lactam is used as an additional monomer, they have only very slight residual quantities of extractable monomers. Chain length regulation can easily be carried out by the intentional addition of, for example, monofunctionally acting compounds, such as monocarboxylic acids or monoamines. As examples of the former, benzoic acid is preferred and, of the latter, cyclohexylamine and isotridecylamine are mentioned.

Furthermore, the copolyamides according to the invention can be modified using conventional polyamide modifying agents and can be adapted to a wide variety of applications. Sterically hindered phenols and phosphites, for example, can be used as heat stabilizers. Also, useful for the same purpose are heat stabilizers of the copper/halogen type. Light stabilizers, such as hindered amines or oxazoline derivatives, can be added alone or in combination with heat stabilizers. Coloring using soluble organic dyestuffs or pigments is possible. Stability to weathering can be improved, for example, by the addition of carbon black, optionally in combination with phenol or a copper/halogen stabilizer.

Furthermore, the inventive copolyamides can be reinforced by mineral fibers, glass fibers, or by the use of other inorganic or organic fibers in addition to the above-mentioned impact resistance modifiers. Moreover, they can be flame-retarded by the use of halogen compounds, red phosphorus, or dehydrating materials such as magnesium hydroxide. The addition of elastomers in order to increase the impact resistance in combination with the addition of a flame-proofing agent, e.g. of the halogen type, is also possible.

The copolyamides according to the invention can easily be used for producing, preferably by injection molding, shaped articles which exhibit high glass transition temperatures little affected by moisture. Such articles are also very rigid and have high impact resistances. The present invention is especially useful for thin-walled molded articles. Further, the inventive copolyamides can also be processed by extrusion to form rigid pipes or cladding for, for example, optical waveguides. As films, they can be processed in combination with other polymers, as by coextrusion.

The following Examples illustrate but do not limit the invention.

The production of the copolyamides according to the invention and the definition of their properties are described below. The following measurements were taken:

1. Water absorption
   at 50% relative humidity
   at 100% relative humidity
2. DSC-measurements:
   Measurements on material
   after attainment of the equilibrium water content at
   50% relative humidity after attainment of the equilibrium water content at 100% relative humidity The DSC-measurements were carried out using the following device:
Type: 1091 B "Thermal Analyzer"
Manufacture: Du Pont
The samples were heated at 20° C./min.

To enable glass transition temperatures to be determined reproducibly in the moist state, the samples were poured into special steel pans and were tightly sealed.
Special pans
Type: "Large volume capsules"
Manufacturer: Perkin Elmer 3. Relative viscosity as a 0.5% solution in m-cresol according to DIN 53727.

The copolyamides according to the invention can be produced in autoclaves which are conventional for polyamide production. The reaction mixture obtained can be worked up separately in a so-called dissolving vessel or directly in the autoclave. If a preliminary melt processing or dissolving vessel is provided, the neutralization reaction, i.e. salt formation, is preferably carried out there with addition of the necessary quantity of water. Heat is released during the neutralization step and pressure builds up if the vessel is closed. If necessary, heating can additionally be carried out with stirring until a homogeneous, easily stirrable mixture is formed. A temperature of 160° C. to 180° C., at which the condensation reaction is initiated, should not be exceeded.

Condensation and processing of the melt take place in an autoclave in an inert gas atmosphere, in particular in the presence of nitrogen; steam can also completely or partially form the inert gas atmosphere, for example during the pressure phase.

The polycondensation reaction is preferably started under pressure; this reduces the undesirable loss of volatile monomer constituents in the initial stage of polycondensation. The melt can be heated slowly during the pressure phase; the pressure is generally released slowly and stepwise. Nitrogen is passed continuously over the melt when atmospheric pressure is reached; the condensation reaction, which can additionally be promoted by application of a vacuum, takes place simultaneously. The melt is stirred continuously during the pressure phase and the subsequent degassing.

A temperature of about 200° C. to 280° C. is maintained for the pressure phase while the pressure is built up from 2 to 30 bar, and a temperature of about 240° C. to 320° C. is used for the degassing and polycondensation phases. A polymer in which the sum of all terminal groups is below 300 ueq/g of polymer is thereby obtained.

EXAMPLES

| Diamine (Mol %) | Dimerized fatty acid (mol %) | Aromatic dicarboxylic acid (Mol %) |
|---|---|---|
| No. 1 Diamine (50) | Dimeric acid 2 (12.0) | IPS (21.1) TPS (16.9) |
| No. 2 Diamine (50) | Dimeric acid 1 (10.0) | IPS (40.0) |
| No. 3 Diamine (50) | Dimeric acid 1 (7.5) | IPS (42.5) |

COMPARISON EXAMPLES

No. 4: Amorphous copolyamide comprising
  43 mol % hexamethylenediamine
  7 mol % Diamine
  45 mol % IPS
  5 mol % TPS
No. 5: Amorphous copolyamide comprising
  29.0 mol % hexamethylenediamine
  19.0 mol % 1-amino-3-aminomethyl-3,5,5-trimethyl-cyclohexane
  5.0 mol % caprolactam
  31.5 mol % TPS
  15.5 mol % IPS
No. 6: Amorphous copolyamide based on Diamine and Dimeric acid 1 corresponds to Example A of CA 861 620.
No. 7: Amorphous copolyamide based on Diamine and Dimeric Acid 1 corresponds to Example IIb of CA 861 620.
No. 8: Amorphous copolyamide based on Diamine and Dimeric acid 1 corresponds to Example IIf of CA 861 620.

EXPLANATION OF TERMS

| Diamine = | 1-amino-3-aminomethyl-3,5,5-trimethyl-cyclohexane |
|---|---|
| Dimeric acid 1 = | (Pripol 1009/Unichema Internat.) mixture of dimerized fatty acids containing: Monomer < 0.1% Dimer > 98.0% Trimer < 1.0% Others < 1.0% |
| Dimeric acid 2 = | (Empol/1014/Henkel-Emery) mixture of dimerized fatty acids containing: Monomer about 4.0% Dimer about 91.0% Trimer about 5.0% |
| IPS = | Isophthalic acid |
| TPS = | Terephthalic acid |

The examples were carried out according to the following details:

EXAMPLE 1

The following educts and additives were introduced into a solubilizer and then into a 20 liter autoclave:
2.720 kg (15.97 mol) Diamine
2.190 kg (3.84 mol) Dimeric acid 2
1.120 kg (6.74 mol) isophthalic acid
0.897 kg (5.40 mol) terephthalic acid
0.019 kg (0.12 mol) 3-amino-1-cyclohexylamino-propane
0.015 kg (0.12 mol) benzoic acid
0.020 kg (0.19 mol) sodium dihydrogen hypophosphite monohydrate
5.0 kg water
0.005 kg antifoaming agent
Total amine/acid ratio: about 1:1 (including chain length regulator).

The reaction mixture was heated for 2 hours at 250° C. under a pressure of 20 bar, and heated over 4 hours from 260° to 295° C. in the degassing phase. The polymer was removed as a strand and granulated.
Result:
relative solution viscosity: 1.294
terminal NH$_2$ groups: 34 μmol/g terminal CO OH groups: 65 μmol/g
melt viscosity (122.6N/270° C.): 605 Pa
glass transition temperature: 158° C.

EXAMPLE 2

The following educts and additives were introduced into a solubilizer and then into a 20 liter autoclave:
3.274 kg (19.22 mol) Diamine
2.195 kg (3.83 mol) Dimeric acid 2
2.195 kg (15.31 mol) isophthalic acid
0.044 kg (0.28 mol) 3-amino-1-cyclohexylaminopropane
0.025 kg (0.24 mol) sodium dihydrogen hypophosphite monohydrate
0.017 kg (0.10 mol) benzoic acid
0.500 kg water
0.005 kg antifoaming agent Total amine/acid ratio: about 1:1 (including chain length regulator).

The mixture was heated to 260° C. for 2 hours under a pressure of 20 bar, and the temperature was raised from 260° C. to 295° C. during a 4 hour degassing phase. The polymer was removed as a strand and granulated.

Result:
relative solution viscosity: 1.280
terminal $NH_2$ groups: 45 μmol/g
terminal CO OH groups: 47 μmol/g
melt viscosity (122.6N/270° C.): 987 Pa
glass transition temperature: 158° C.

EXAMPLE 3

The following educts and additives were introduced into a 20 liter autoclave
3.441 kg (20.21 mol) Diamine
1.730 kg (3.02 mol) Dimeric acid 2
2.842 kg (17.11 mol) isophthalic acid
0.044 kg (0.28 mol) 2-amino-1-cyclohexylaminopropane
0.020 kg (0.19 mol) sodium dihydrogen hypophosphite monohydrate
0.500 kg water
0.005 kg antifoaming agent Total amine/acid ratio: about 1:1 (including chain length regulator).

The mixture was heated to 260° C. for 2 hours under a pressure of 20 bar, and the temperature was raised from 260° C. to 295° C. during the 4 hour degassing phase. The polymer was removed as a strand and granulated.

Result:
relative solution viscosity: 1.325
terminal $NH_2$ groups: 49 umol/g
terminal CO OH groups: 54 umol/g
melt viscosity (122.6N/270° C.) 1875 Pa
glass transition temperature: 177° C.

The properties of the copolyamides that have been prepared are collated in Tables 1 and 2.

TABLE 1

| | Analytical Values | | | |
| | Terminal groups $-NH_2$ [μMol/g] | Terminal groups $-COOH$ [μMol/g] | Relative Viscosity | Melt Viscosity 270°/122.6 N [Pa · s] |
|---|---|---|---|---|
| Example | | | | |
| No. 1 | 34 | 65 | 1.294 | 603 |
| No. 2 | 45 | 47 | 1.280 | 987 |
| No. 3 | 49 | 54 | 1.260 | 1375 |
| Comparison Examples | | | | |
| No. 4 | 35 | 110 | 1.44 | 1200 |
| No. 5 | 50 | 50 | 1.36 | 2000 |
| No. 6 | 33 | 25 | | |
| No. 7 | 5 | 86 | 1.203 | |
| No. 8 | 13 | 189 | | |

| | Tg dry [°C.] | Tg Equivalent weight water uptake 100% humidity 23° C. [°C.] | Equivalent weight water uptake 100% humidity 23° C. [%] | Tg Equivalent weight water uptake 50% humidity 23° C. [°C.] | Equivalent weight water uptake 50% humidity 23° C. [%] |
|---|---|---|---|---|---|
| Example | | | | | |
| No. 1 | 158 | 120 | 3.3 | 138 | 1.3 |
| No. 2 | 165 | 133 | 3.9 | 149 | 1.4 |
| No. 3 | 177 | 131 | 4.5 | 163 | 1.8 |
| Comparison Examples | | | | | |
| No. 4 | 140 | 62 | 7.3 | 101 | 2.8 |
| No. 5 | 170 | 82 | 9.8 | 123 | 3.0 |
| No. 6 | 53 | | | | |
| No. 7 | 13 | | | | |
| No. 8 | −11 | (partially crystalline PA, melting point: 57° C.) | | | |

Table 2 shows clearly a small change in Tg of the inventive copolyamides owing to water-uptake, even after exposure to air of 100% and 50% relative humidity. This is the reason their application in both water and humid environments is excellent even above 100° C., while the comparative products, as a result of their high water-uptake and enormous drop of Tg, fail in boiling water and at temperatures near 100° C.

What we claim is:
1. An amorphous copolyamide derived from a polymeric condensation product consisting essentially of
a) 50 mol % of at least one cycloaliphatic diamine of the Formula

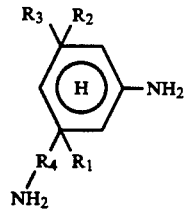

wherein $R_1$, $R_2$, and $R_3$, are individually alkyl radicals having 1 to 3 carbon atoms; and $R_4$ is a divalent alkylene having 1 to 3 carbon atoms;
b) 5 to 25 mol % of at least one dimerized fatty acid, and
c) 25 to 45 mol % of at least one aromatic dicarboxylic acid, and d) 0 to 50 weight %, based on the total amount of a), b), and c), of at least one further polyamide forming monomer.

2. The copolyamide of claim 1 wherein a), b), and c) total 100 mol %.

3. The copolyamide of claim 2 wherein b) is 5 to 12 mol % and c) is 38 to 45 mol %.

4. The copolyamide of claim 1 wherein said cycloaliphatic diamine is 1-amino-3-aminomethyl-3,5,5-trimethylcyclohexane.

5. The copolyamide of claim 1 wherein said dimerized fatty acid is derived from a long chain unsaturated fatty acid.

6. The copolyamide of claim 5 wherein said long chain fatty acid has at least 18 carbon atoms.

7. The copolyamide of claim 1 wherein said dimerized fatty acid has dimer content of at least 90% by weight.

8. The copolyamide of claim 7 wherein said dimer content is at least 97% by weight.

9. The copolyamide of claim 1 wherein said aromatic dicarboxylic acid is selected from the group consisting of isophthalic acid, terephthalic acid, and mixtures thereof.

10. The copolyamide of claim 9 wherein said mixtures contain at least 25 mol % of said isophthalic acid.

11. The copolyamide of claim 1 wherein said further polyamide-forming monomer is selected from the group consisting of aliphatic diamines and aromatic/aliphatic diamines reacted with aliphatic dicarboxylic acids, amino acids, and lactams.

12. The copolyamide of claim 11 wherein said aliphatic diamines have 2 to 20 carbon atoms, said aromatic/aliphatic diamines have 6 to 12 carbon atoms, said aliphatic dicarboxylic acids have 6 to 20 carbon atoms, and said amino acids and said lactams each have 4 to 14 carbon atoms.

13. The copolyamide of claim 1 wherein said cycloaliphatic diamine is a 1-amino-3-alkylamino-3,5,5-trialkylcyclohexane.

14. The copolyamide of claim 1 wherein said aromatic dicarboxylic acid is selected from the group consisting of mononuclear, polynuclear, substituted, and unsubstituted acids.

15. The copolyamide of claim 14 wherein said aromatic dicarboxylic acid is selected from the group consisting of isophthalic acid, terephthalic acid, naphthalene dicarboxylic acid, 1,1,3-trimethyl-3-phenylindan-4',5-dicarboxylic acid, and mixtures thereof.

16. A process for the preparation of the copolyamide of claim 1 comprising precondensing said a), b), c), and optionally d) in a first stage under a steam atmosphere, a pressure of 2 to 30 bar, and a temperature of 200° to 280° C. to form a melt; thereafter releasing said pressure and condensing said melt under an inert gas at or below atmospheric pressure at a temperature of 240° to 320° C. to produce a copolyamide having less than 300 ueq terminal groups per gram of said copolyamide.

17. A shaped article of the copolyamide of claim 1.

* * * * *